(12) United States Patent
Bailey

(10) Patent No.: US 8,087,800 B2
(45) Date of Patent: Jan. 3, 2012

(54) MULTI-CAVITY LED ARRAY RGB COLLIMATION OPTIC

(75) Inventor: Edward Bailey, Westhampton, NJ (US)

(73) Assignee: Lighting Science Group Corporation, Satellite Beach, FL (US)

( * ) Notice: Subject to any disclaimer, the term of this patent is extended or adjusted under 35 U.S.C. 154(b) by 114 days.

(21) Appl. No.: 12/680,700

(22) PCT Filed: Oct. 1, 2008

(86) PCT No.: PCT/US2008/078368
§ 371 (c)(1),
(2), (4) Date: Mar. 29, 2010

(87) PCT Pub. No.: WO2009/046050
PCT Pub. Date: Apr. 9, 2009

(65) Prior Publication Data
US 2010/0238645 A1 Sep. 23, 2010

Related U.S. Application Data

(60) Provisional application No. 60/976,693, filed on Oct. 1, 2007.

(51) Int. Cl.
*F21V 5/00* (2006.01)
(52) U.S. Cl. .......... 362/245; 362/231; 362/246; 362/84; 362/268

(58) Field of Classification Search .......... 362/244–246, 362/231, 268, 305–310; 313/512
See application file for complete search history.

(56) References Cited

U.S. PATENT DOCUMENTS

| | | | | |
|---|---|---|---|---|
| 5,302,778 | A * | 4/1994 | Maurinus | 174/521 |
| 6,364,487 | B1 * | 4/2002 | Weber et al. | 353/30 |
| 7,072,096 | B2 | 7/2006 | Holman et al. | |
| 7,488,101 | B2 * | 2/2009 | Brukilacchio | 362/554 |
| 7,837,349 | B2 * | 11/2010 | Chinniah et al. | 362/244 |
| 7,959,326 | B2 * | 6/2011 | Laporte | 362/249.02 |
| 2006/0002108 | A1 | 1/2006 | Ouderkirk et al. | |
| 2006/0098451 | A1 | 5/2006 | Hsu et al. | |

OTHER PUBLICATIONS

PCT International Search Report and Written Opinion for International Application No. PCT/US08/78368; International Filing date Oct. 1, 2008; Mailing Date: Dec. 2, 2008; 9 pgs.

\* cited by examiner

*Primary Examiner* — Ali Alavi
(74) *Attorney, Agent, or Firm* — Cantor Colburn LLP

(57) ABSTRACT

This invention relates to optical devices. More specifically, the present invention relates to a collimated optical light source assembly that produces a uniform white light. Specifically, light from a multi-cavity RGB LED array is dispersed in a reflecting cavity having a Lambertian texture on the interior surface. The light is then emitted though a lenslet array and a cone lens which together further disperses the light emitted by the individual LEDs. The dispersed light is then collimated by a reflector.

20 Claims, 8 Drawing Sheets

RGB array collimation optic assembly

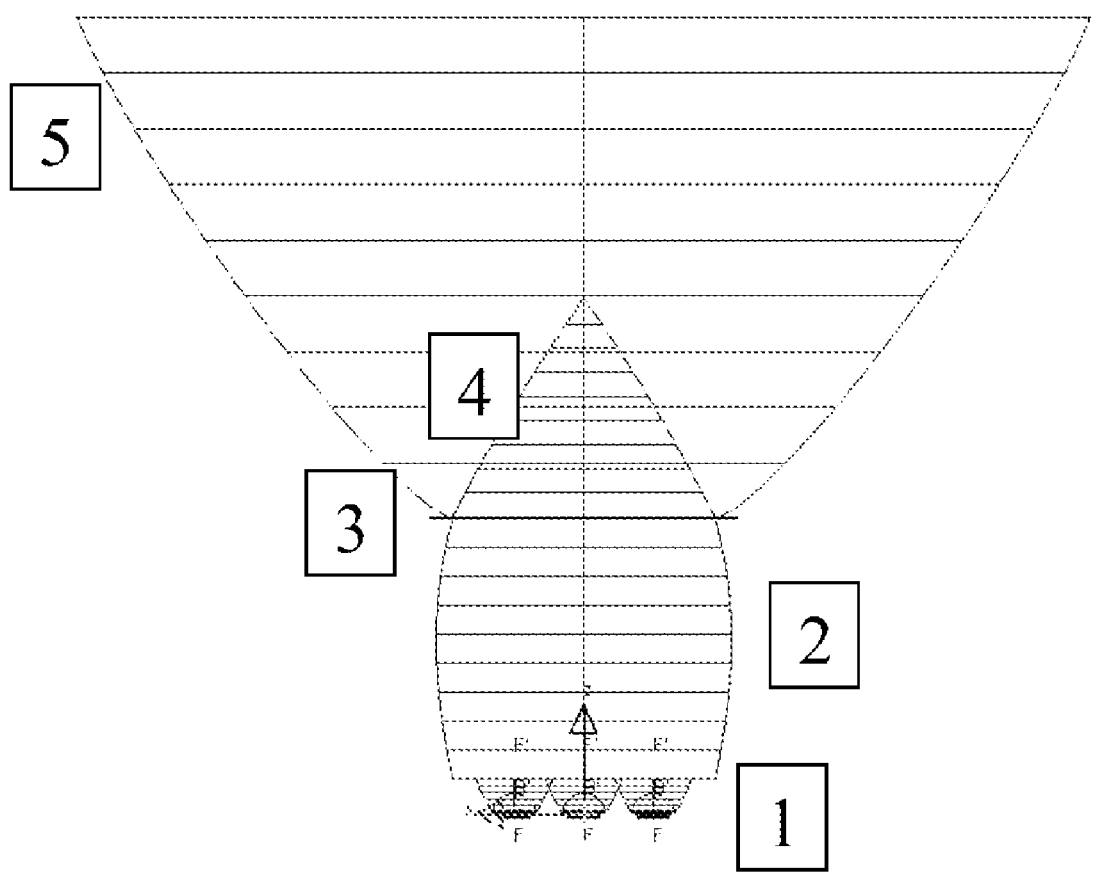
Figure 1. RGB array collimation optic assembly

Figure 2. 7-cavity RGB LED light engine array
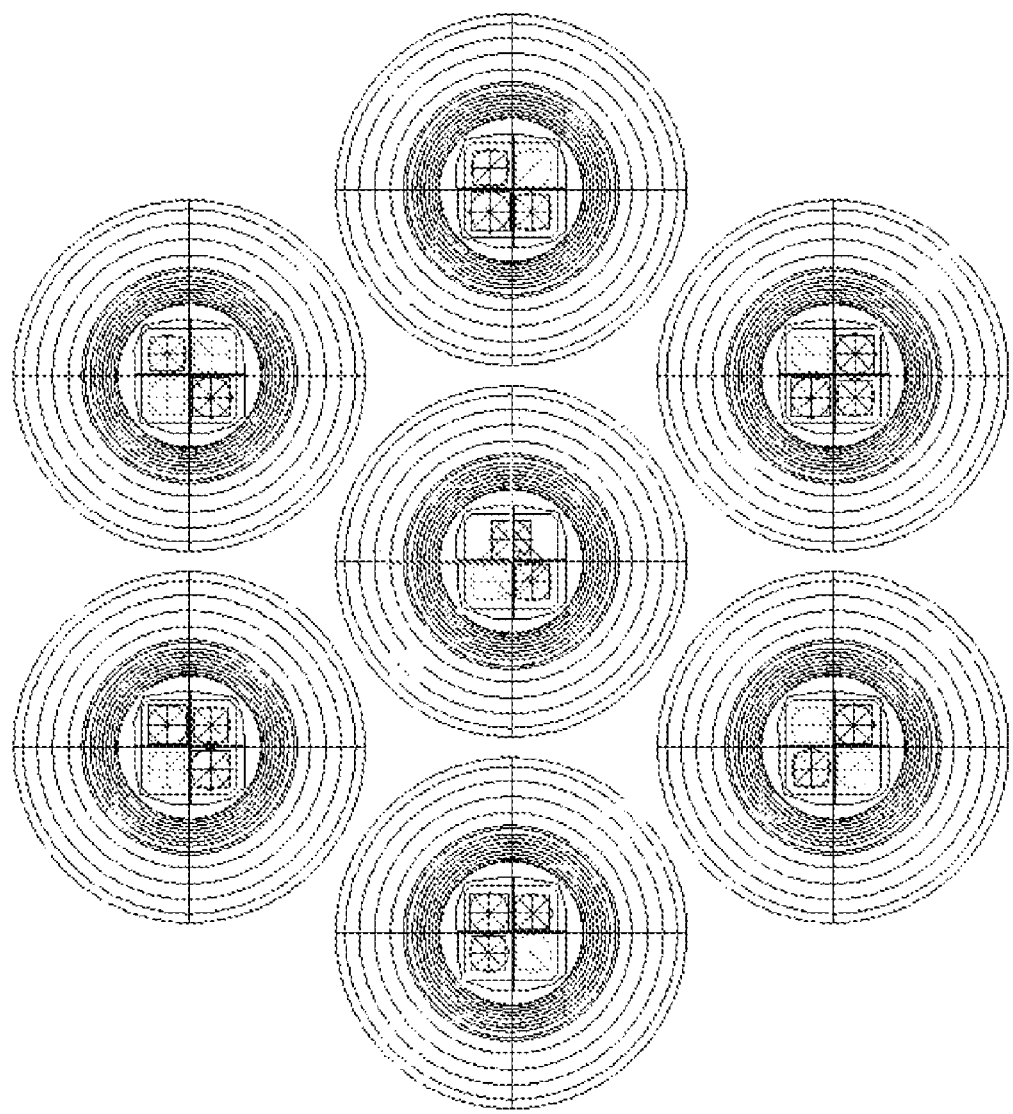

Figure 3. Raytrace
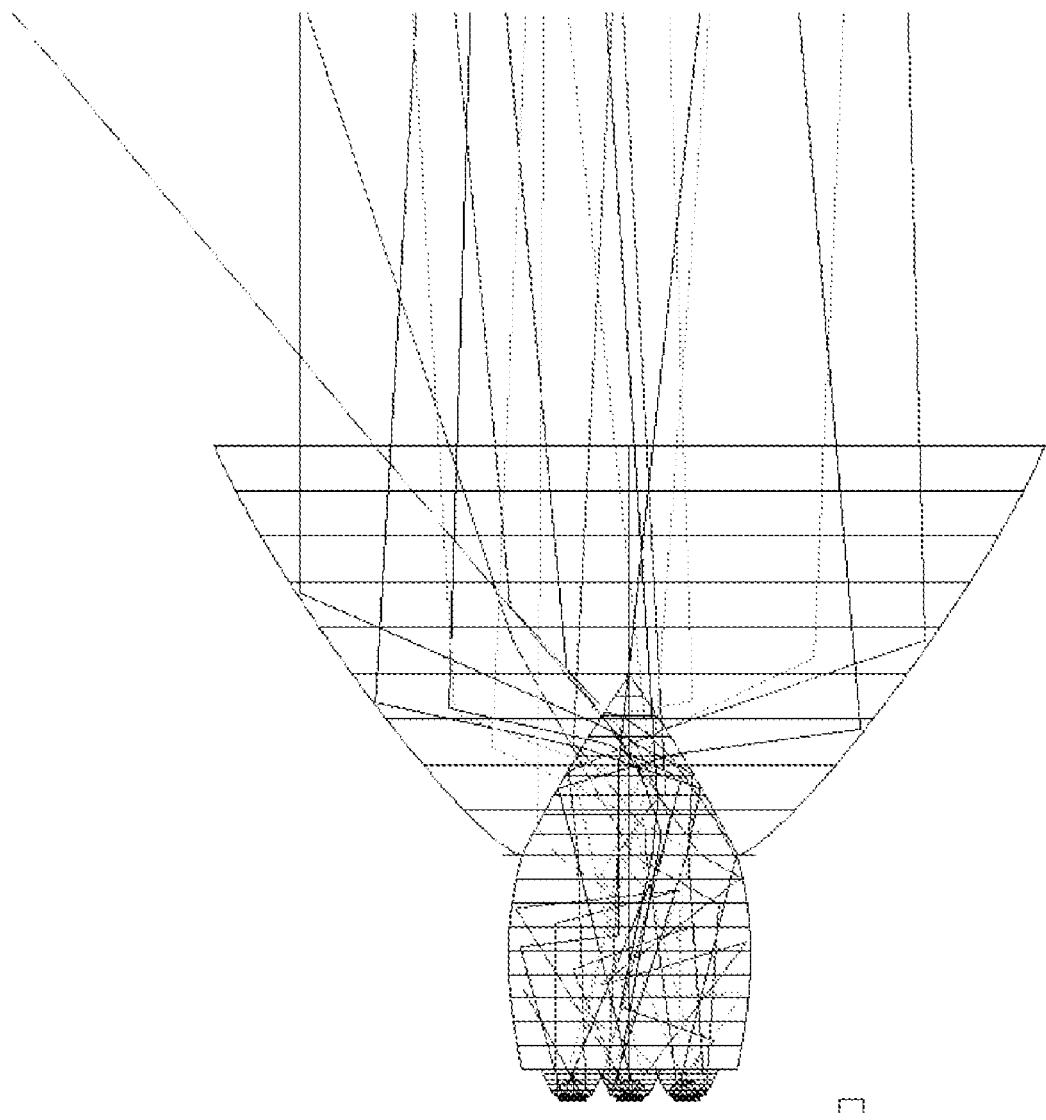

Figure 4. Intensity distribution of an 11° Beam, and 35° Field.
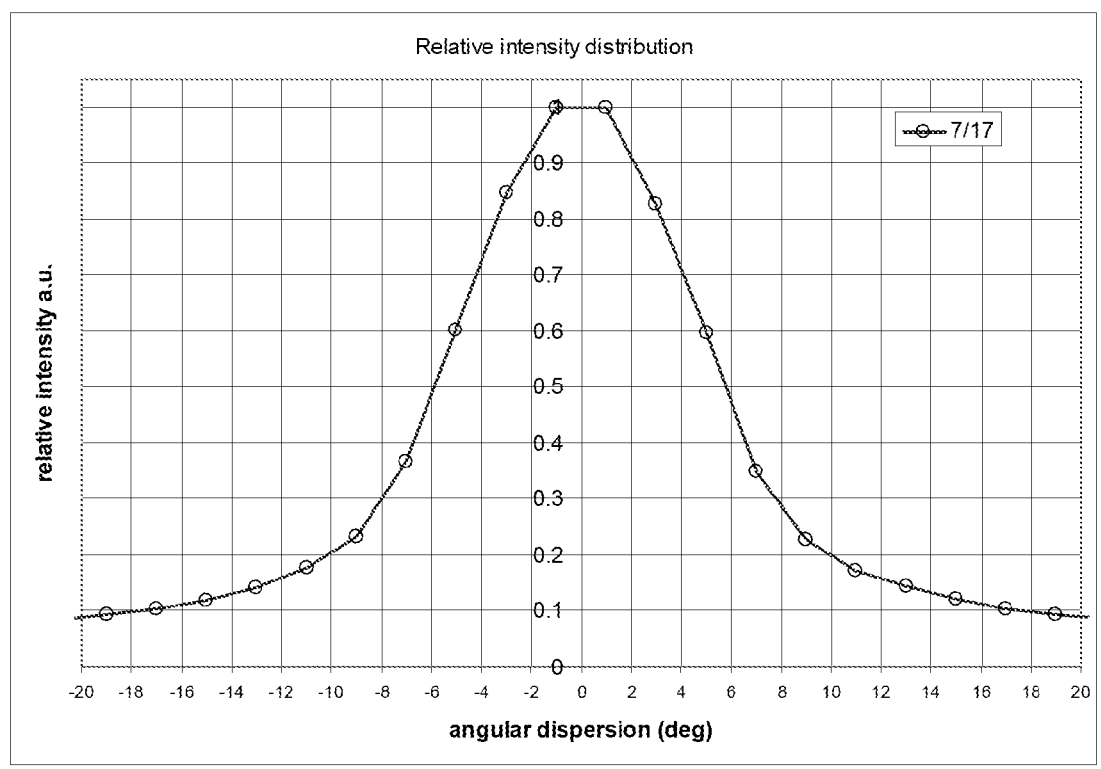

Figure 5. Illuminance distribution at 1 meter from a 7-cavity LED array source and optic
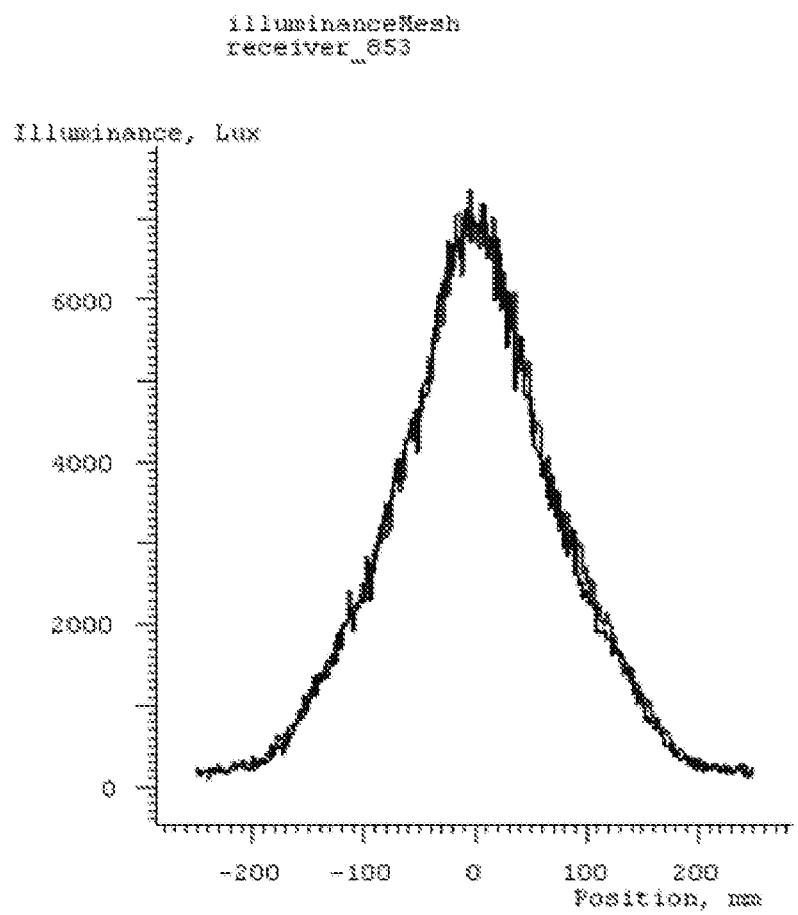

Figure 6. R+G+B primaries, producing a 6500°K white equivalent
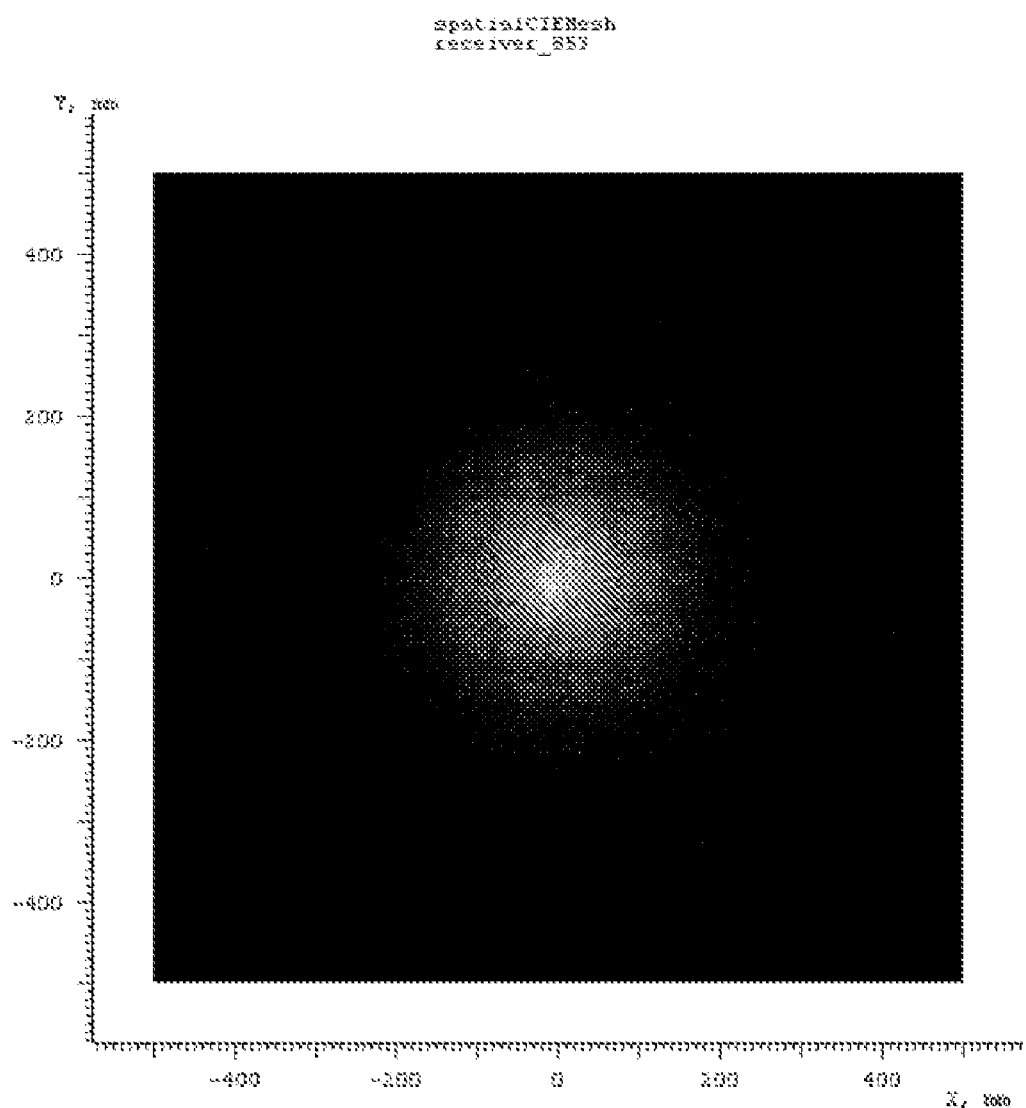

Figure 7. R+G+B primaries, producing a 4750°K white equivalent
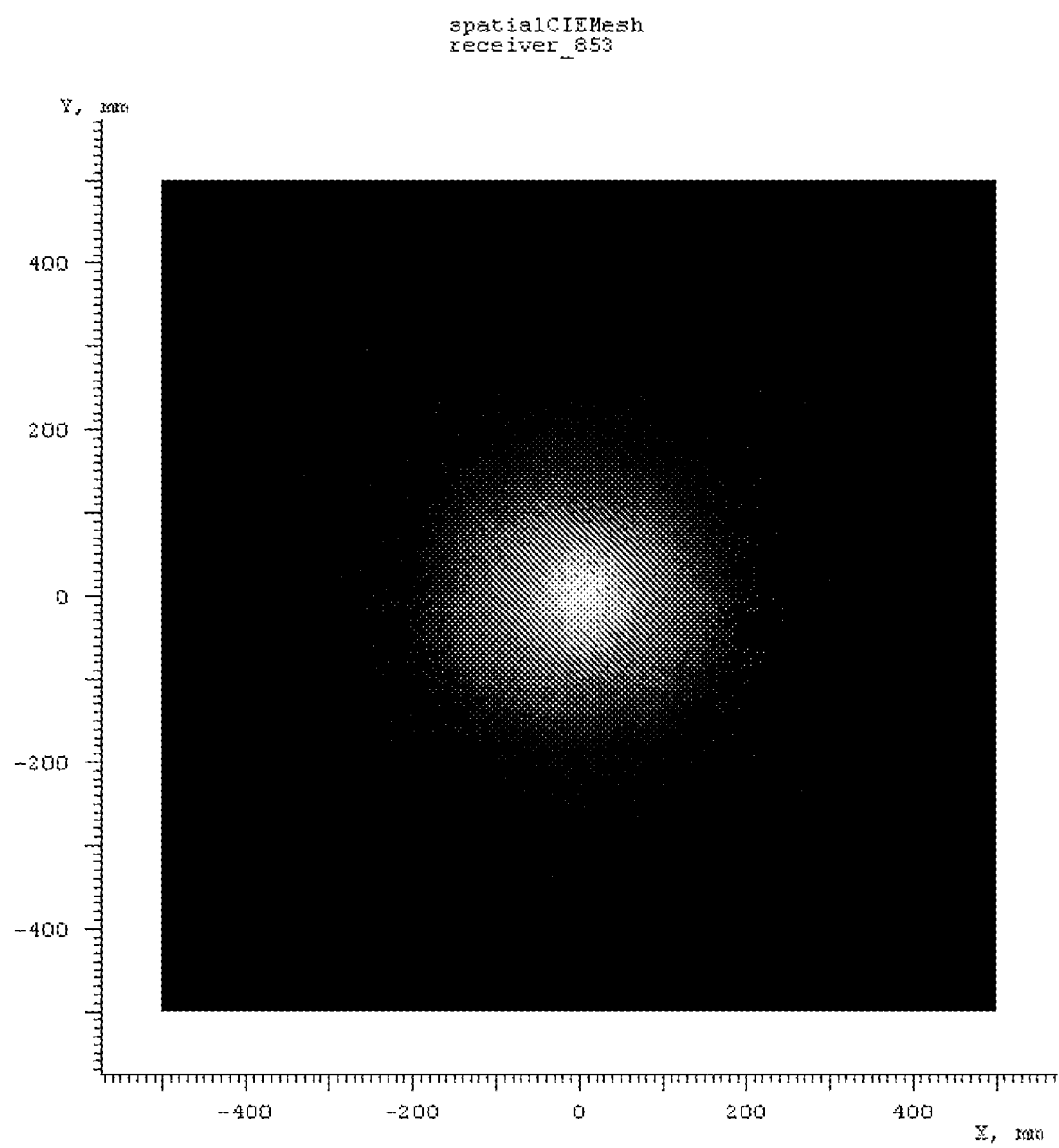

Figure 8. R+G+B primaries, producing a 2850°K white equivalent
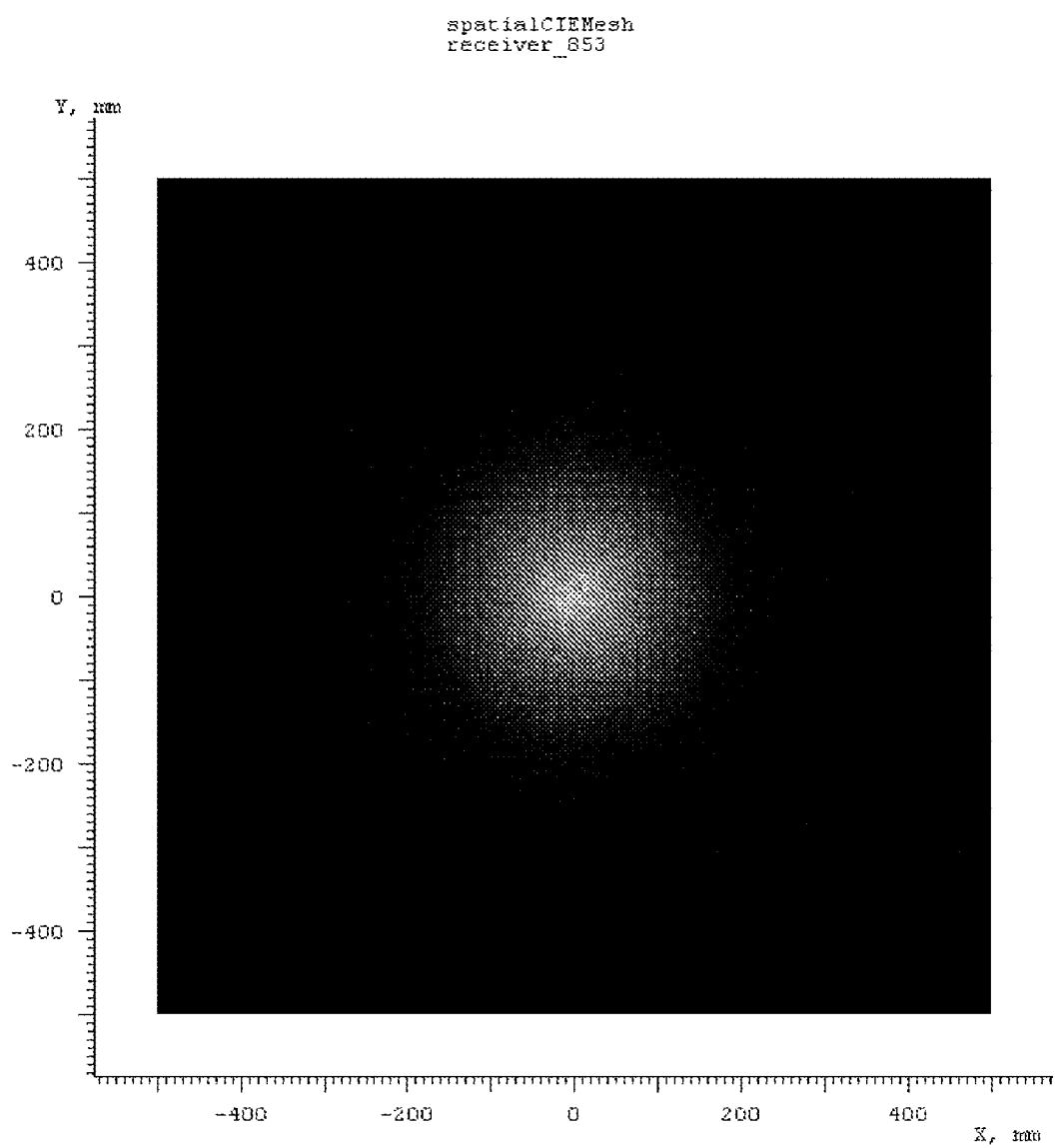

MULTI-CAVITY LED ARRAY RGB COLLIMATION OPTIC

This application claims the benefit of U.S. provisional application No. 60/976,693, filed on Oct. 1, 2007, the entire disclosure of which is incorporated by reference.

References including various publications may be cited and discussed in the description of this invention. Any citation and/or discussion of such references is provided merely to clarify the description of the present invention and is not an admission that any such reference is "prior art" to the present invention. All references cited and discussed in this specification are incorporated herein by reference in their entirety and to the same extent as if each reference was individually incorporated by reference.

FIELD OF THE INVENTION

This invention relates to optical devices. More specifically, the present invention relates to collimated optical light source assemblies that produce a uniform white light.

BACKGROUND OF THE INVENTION

Entertainment, architectural and theater industries have applications which benefit from the creation of millions of colors for light painting, product enhancement, or special effect. Light emitting diodes of multiple primary wavelengths may be placed in the same cavity to produce such artistic color effects. Multiple cavities each comprised of multiple primaries may be arranged in such a way as to provide over 1000 lumens of red, green or blue light or any combination thereof. Secondary optics are required to throw light of many different colors over a long distance which requires light beams with minimum luminous intensity dispersion.

LED light engines with multi-primary emitters are known, for instance the 7-cavity Lamina Titan™ light engine. By themselves, light engines are historically difficult to both collimate to a narrow beam as well as achieve acceptable color uniformity. Traditional optics lack sufficient color uniformity enhancement features, and project regions of light with high discrete, non-homogenized intensities of the individual primary colors red, green and blue. Poor composite color uniformity is produced as a result, which is not desirable for some applications. A need exists for a combination of color uniformity enhancement and collimation features that direct the light from a multi-cavity, wide beam, e.g., 60 degree LED light array to a narrow beam of light or a beam characterized as comprising an intensity dispersion <15 deg at the half maximum of the intensity peak.

SUMMARY OF THE INVENTION

It is more acceptable to combine the light from multiple red/green/blue ("RGB") primary color emitters arranged in a multi-cavity LED array to achieve a variable white color temperature from 2000° K. to 8000° K. for example. 2000° K. represents the blackbody temperature equivalent to a warm white color. 8000° K. is the blackbody temperature equivalent to a cool white or a white comprised of more blue. Preferably, in one embodiment of the invention the multi-cavity LED array includes seven LED cavities.

A device in accordance with an embodiment of the present invention preferably includes uniformity and collimation features shown in FIG. 1, which may include one or more of the following:

1) A multi-cavity RGB LED array 1;
2) A reflecting cavity 2 with Lambertian scattering texture;
3) A Lenslet array 3;
4) Cone lens 4;
5) Reflector 5;

The combined effect of these uniformity and collimation features is to collimate a relatively wide-angle light beam emitted by an LED array into a relatively narrow-angle collimated light beam, such that color uniformity of the collimated light beam is enhanced.

BRIEF DESCRIPTION OF THE DRAWINGS

The present invention will be more readily understood from the detailed description of exemplary embodiments presented below considered in conjunction with the accompanying drawings, in which:

FIG. 1 is a side schematic view of one embodiment of the RGB array collimation optical assembly of the present invention;

FIG. 2 is a top view of LED cavity placement; Each of the 6 peripheral cavities may contain 4 light emitting diodes of different primary wavelengths. The center cavity may have 1 each of red green and blue or other primary direct emission light emitting diode.

FIG. 3 is a ray trace diagram illustrating some of the light paths through the embodiment of FIG. 1;

FIG. 4 is a raytracing simulation plot of the relative intensity distribution as a function of angular dispersion.

FIG. 5 is a raytracing simulation plot of the illuminance distribution at a distance of 1 meter from the 7-cavity LED array source and optic.

FIG. 6 is a measured beam speckle pattern for R+G+B primary colors combined in correct ratio to produce a 6500° K. white color temperature equivalent in which the primary color combination produces approximately a white with 1931 x,y chromaticity coordinates of 0.3136 and 0.3237;

FIG. 7 is a measured beam speckle pattern for R+G+B primary colors combined in correct ratio to produce a 4750° K. white color temperature equivalent; in which the primary color combination produces a white with approximately 1931 x,y chromaticity coordinates in the vicinity of 0.3525 and 0.3574.

FIG. 8 is a measured beam speckle pattern for R+G+B primary colors combined in correct ratio to produce a 2850° K. white color temperature equivalent. The white chromaticity coordinates are near 0.4480 and 0.4076 respectively.

DETAILED DESCRIPTION OF THE INVENTION

Features of an embodiment of the present invention are shown in FIG. 1. The reflecting cavity 2, lenslet array 3, cone lens 4 and reflector 5 are collectively referred to herein as the collimation optic. The collimation optic is used to decrease the intensity dispersion of a multi-cavity wide beam, e.g., 60 degree primary light engine cavity 1 in which the light emitters include light emitting diodes of different primary wavelengths, and wherein 60 degree refers to the beam angle of the light collectively emitted by the light engine cavities 1. The multi-cavity 60 degree primary light engine may for example be the 7-cavity Lamina Titan™ light engine. A light engine with other than 7 cavities may also be used, so long as the beam angle of the emitted light, prior to any collimation optics, is approximately 60 degrees and the field angle is approximately 100 degrees.

Light exiting the LED array 1 disperses at approximately a 60 degree beam angle. The light then proceeds to reflecting cavity 2 which preferably has a barrel spline shape or elliptical cross-sectional shape with truncated entrance and exit planes. This desired cross-sectional shape is matched to the 60 degree beam width of the LED array 1, and produces the greatest on-axis light intensity. However deviations from this cross-sectional shape are usable but will produce a reduced on-axis light intensity. For example, a deviation of 5% RMS from the prescribed cross-sectional shape can produce a 20% reduction in on-axis intensity. The reflecting cavity 2 has symmetry around the optical axis.

The interior surface of the reflector cavity 2 has a Lambertian texture. Intensity of light reflected from the interior of reflector cavity 2 varies with the cosine of the angle with respect to normal or 0 degree dispersion. A Lambertian scatterer redirects light with constant luminance when viewed at any angle. The Lambertian scatter texture randomizes the light of the primary colors in such a manner that light will emerge from the top of the reflector cavity 2 at an approximately equal intensity in all radial angles around the axis of rotation of the reflector cavity 2.

Materials such as AMODEL™ polyphthalamide (PPA) from Solvay Advanced Polymers or equivalent can be molded into the desired cross-sectional shape with high reflectivity, and including the Lambertian scatter texture. Some loss is incurred in the randomization scatter process as such the enhancement of color uniformity has a trade-off. For example, although the Lambertian scatter texture of the reflector randomizes the light fields of the primary colors, it also directs light back towards the source which is undesirable. A reflector plate filling the spaces between the light cavities helps to recirculate some of this light back towards the exit aperture.

After scattering from the surface of the reflector cavity 2, the light passes through a lenslet array 3. The lenslet array 3 produces intermediate micro-images which further homogenize the light. The lenslet array 3 may include for instance a lenslet array as described in U.S. patent application Ser. No. 11/737,101 and provisional U.S. Patent Application No. 60/971,255, the entire contents of which are hereby incorporated herein in their entirety, and which are under a common obligation of assignment as with the present application.

After the light passes through the lenslet array 3, it enters into and passes through the walls of an approximately cone-shaped lens 4, which acts as a dispersing optic. A revolved polynomial is the preferred cross-sectional shape for the cone-shaped lens 4 because deviations in the shape from that of a revolved polynomial will produce unwanted artifacts or holes in the intensity pattern of the beam of light, i.e., a region or zone with reduced illuminance which the eye can detect.

However, changes to the revolved polynomial shape can also be tailored to produce different beam patterns when the reflector is changed to match, thus offering opportunities for different beam patterns. The eye perceives illuminance variations at $2.4*LOG(x,y)$ where x,y is the illuminance zone value. The x and y values represent the indices of vertical and horizontal spatial zones as referenced from the optical axis.

Light disperses through the side of the cone-shaped lens 4 for final collimation by the reflector 5. A 4th-order polynomial may describe the shape of the cone-shaped dispersing lens, for instance: $z=2E-05x^4+0.0007x^3-0.0056x^2+1.4405x+70.761$. A 4th order polynomial which approximates a solution for the shape of the final collimation reflector is, for instance: $z=8E-06x^4+0.0014x^3+0.0973x^2+1.8351x+49.335$ in which z represents the forward light direction orthogonal to the source plane. A secondary lens is not recommended as the additional loss/collimation benefit ratio is too high. The final reflector preferably has an exit aperture which is larger than the input aperture or it will not collimate light. A confocal parabolic concentrator is commonly used to collimate light exiting from a finite source aperture.

By producing homogenous light from multiple primary color LED emitters housed in multiple cavities, the light intensity of each of the primary color emitters may be tuned to produce a variable white color temperature from warm to cool white. Other colors may also be produced as contained with the chroma triangle produced by the wavelengths of the primaries. However, colors of the LED die contained within the LED array 1 may be entirely arbitrary depending on the chroma polygon required, e.g., ultraviolet or infrared LEDs, or combinations of hybrid phosphor/direct emission sources is also possible so long as the reflective materials used in the assembly are tailored to efficiently reflect those wavelengths. Cavities containing only diode pumped phosphor may be interspersed with direct emission monochromatic primary colors.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application may disclose several numerical range limitations. The polynomials enclosed are tailored specifically to the 60 degree intensity distribution pattern of the 7 cavity LED source array. Other ranges or variations from the polynomials disclosed may be used. The color uniformity enhancement features allow for the production of a tunable white temperature from 2000° K. to 8000° K. To produce a 6500° K. white the approximate ratio of red, green and blue light is 50% 457 nm 26% 525 nm, and 23% 625 nm. To produce 4750° K. white the approximate spectral power ratio of light is 40% 457 nm, 28% 525 nm, and 32% 625 nm red. To produce 2850° K. warm-white the spectral power ratio is approximately 16% 457 nm, 26% 525 nm, and 58% 625 nm light. The entire disclosure of the patents and publications referred in this application are hereby incorporated herein by reference.

The invention claimed is:

1. An apparatus for producing collimated uniform white light, comprising:
   a reflecting cavity having a predetermined reflective surface texture, configured to receive light from a light engine and to produce reflected light;
   a micro-lenslet array disposed to receive at least a portion of the reflected light to produce a first dispersed light;
   a concave lens disposed to receive at least a portion of the first dispersed light to produce a second dispersed light; and
   a collimation reflector disposed to reflect at least a portion of the second dispersed light to produce collimated uniform white light.

2. The apparatus of claim 1, wherein the predetermined reflective surface texture of the reflecting cavity comprises at least one of: a Lambertian scattering texture; and, a Lambertian texture.

3. The apparatus of claim 2, wherein the Lambertian texture is configured to produce light that emerges from the top of the reflecting cavity at an approximately equal intensity in all radial angles around an axis of rotation of the reflecting cavity.

4. The apparatus of claim 1, wherein the reflecting cavity has comprises at least one of: a vertical cross section shape selected from the group consisting of barrel spline shape and elliptical cross-sectional shape with truncated entrance and exit planes; a vertical cross section shape matched to the beam width of the received light; and, symmetry around the optical axis.

5. The apparatus of claim 1, wherein the micro-lenslet array is configured to produce intermediate micro-images.

6. The apparatus of claim 1, wherein the concave lens comprises at least one of: a cone-shape; and, a vertical cross-section shape of a revolved polynomial.

7. The apparatus of claim 1, wherein the collimation reflector has comprises at least one of: a vertical cross-section shape of a revolved polynomial; and, a confocal parabolic concentrator.

8. A system for producing collimated uniform white light, comprising: a light engine; a reflecting cavity having a predetermined reflective surface texture, configured to receive light from the light engine and to produce reflected light; a micro-lenslet array disposed to receive at least a portion of the reflected light to produce a first dispersed light; a concave lens disposed to receive at least a portion of the first dispersed light to produce a second dispersed light; and a collimation reflector disposed to reflect at least a portion of the second dispersed light to produce collimated uniform white light.

9. The system of claim 8, wherein the light engine comprises an LED array disposed among a plurality of light-engine cavities.

10. The system of claim 9, wherein at least one primary direct emission LED is disposed within a central light-engine cavity of the plurality of light-engine cavities, and four LEDs of different primary wavelengths are disposed within at least one of a plurality of non-central light-engine cavities.

11. The system of claim 9, wherein a diode-pumped phosphor is disposed within at least a portion of the plurality of light-engine cavities.

12. The system of claim 9, wherein the light engine further comprises a reflector disposed between at least a portion of the plurality of light-engine cavities.

13. The system of claim 8, wherein the light engine has a beam width of approximately 60 degrees.

14. A method for producing collimated uniform white light, comprising the following steps: emitting light using a plurality of LEDs disposed within a plurality of light-engine cavities; reflecting at least a portion of the emitted light, using a reflecting cavity having a predetermined reflective surface texture, to produce a reflected light; dispersing at least a portion of the reflected light, using a micro-lenslet array, to produce a first-dispersed light; dispersing at least a portion of the first-dispersed light, using a concave lens, to produce a second-dispersed light; and receiving at least a portion of the second-dispersed light, using a collimation reflector, to produce collimated uniform white light.

15. The method of claim 14, further comprising the steps of: disposing at least one primary direct emission LED within a central light-engine cavity of the plurality of light-engine cavities; and disposing four LEDs of different primary wavelengths within at least one of a plurality of non-central light-engine cavities.

16. The method of claim 14, wherein the step of emitting light further comprises emitting light having a beam width of approximately 60 degrees.

17. The method of claim 14, further comprising the step of reflecting light from between at least a first portion and a second portion of the plurality of light-engine cavities.

18. The method of claim 14, further comprising the step of converting the wavelength of light from within at least a portion of the plurality of light-engine cavities by use of a phosphor.

19. The method of claim 18, further comprising tuning the emitted light to a predetermined color by using a selected phosphor.

20. The method of claim 14, further comprising tuning the emitted light to a predetermined color by using one or more selected color LEDs.

\* \* \* \* \*

UNITED STATES PATENT AND TRADEMARK OFFICE
CERTIFICATE OF CORRECTION

PATENT NO. : 8,087,800 B2
APPLICATION NO. : 12/680700
DATED : January 3, 2012
INVENTOR(S) : Edward Bailey It is certified that error appears in the above-identified patent and that said Letters Patent is hereby corrected as shown below:

On the Title page, Item [75] Inventor, please delete "Westhampton" and insert -- Westampton --, therefor.

In the Specifications:

In column 2, line 25, delete "red green" and insert -- red, green --, therefor.

In column 4, line 41, after "457 nm" insert -- , --.

In the Claims:

In column 5, line 7, in Claim 4, before "comprises" delete "has".

In column 5, line 19, in Claim 7, before "comprises" delete "has".

Signed and Sealed this
Twenty-third Day of July, 2013

Teresa Stanek Rea
*Acting Director of the United States Patent and Trademark Office*